US005159334A

United States Patent [19]

Baumert et al.

[11] Patent Number: 5,159,334

[45] Date of Patent: Oct. 27, 1992

[54] REMOTE-CONTROL SYSTEM FOR LOCKS

[75] Inventors: Heinz Baumert, Sindelfingen; Thomas Farnung, Weil der Stadt; Ferdinand Greiner, Aidlingen, all of Fed. Rep. of Germany

[73] Assignee: Mercedes-Benz AG, Fed. Rep. of Germany

[21] Appl. No.: 661,002

[22] Filed: Feb. 26, 1991

[30] Foreign Application Priority Data

Feb. 27, 1990 [DE] Fed. Rep. of Germany ....... 4006125

[51] Int. Cl.[5] ...................... H04Q 1/00; H04B 10/00; G08C 23/00

[52] U.S. Cl. ........................ 340/825.720; 340/825.31; 359/142

[58] Field of Search .................... 340/825.710, 825.31, 340/825.69, 825.72, 984; 341/176; 359/142, 144, 147, 150, 151, 157, 173, 174, 181; 318/16; 307/10.1, 10.5; 180/287, 289

[56] References Cited

U.S. PATENT DOCUMENTS 2,543,789 3/1951 MacMillan ........................... 318/16
3,936,833 2/1976 Bush .................................... 341/176
4,247,850 1/1981 Marcys ................................ 341/176
4,459,591 7/1984 Haubner et al. .................... 359/157
4,479,264 10/1984 Lockett et al. ..................... 359/174
4,761,777 8/1988 Edwards et al. .................... 359/173
4,843,639 6/1989 Beals .................................. 359/147
4,868,409 9/1989 Tanaka et al. ...................... 307/10.5
4,971,417 11/1990 Krinsky et al. ..................... 359/174
5,008,667 4/1991 Palmer et al. ....................... 340/984
5,040,990 8/1991 Suman et al. ....................... 307/10.1
5,073,981 12/1991 Giles et al. ......................... 359/174

FOREIGN PATENT DOCUMENTS 3314072 1/1986 Fed. Rep. of Germany .
3043627 12/1987 Fed. Rep. of Germany .
8804929 8/1988 Fed. Rep. of Germany .
3828794 6/1989 Fed. Rep. of Germany .

*Primary Examiner*—Donald J. Yusko
*Assistant Examiner*—Andrew Hill
*Attorney, Agent, or Firm*—Evenson, Wands, Edwards, Lehahan & McKeown

[57] ABSTRACT

A remote-control system for locks having an infrared hand-held transmitter of the remote-control system, which is used for the remote-control of the central locking system of a motor vehicle, and a receptacle for the insertion of the transmitter arranged in the motor vehicle. At least one optical cable, leading into the region of the receptacle for carrying signals from the transmitter, is routed from the receptacle to at least one exit hole arranged on the outer skin of the motor vehicle. In this way, the control of a receiver arranged outside the motor vehicle and associated preferably with a remote-controlled garage door drive is made possible.

20 Claims, 3 Drawing Sheets

REMOTE-CONTROL SYSTEM FOR LOCKS

BACKGROUND AND SUMMARY OF THE INVENTION

The present invention relates to a remote-control system for locks with a mobile infrared transmitter for generating and radiating in a contactless manner directional, coded control signals upon actuation of at least one transmitting key. A first receiver is tuned to the transmitter and is arranged on the motor vehicle for receiving and for processing the coded control signals transmitted by the transmitter and for triggering switching effects on a remote-controlled vehicle locking system. There is a receptacle in the motor vehicle for the transmitter, and at least one optical cable leading into a region of the receptacle that carries signals from the transmitter. A second receiver corresponds at least indirectly to the optical cable, and triggers switching effects on a further locking device upon the reception of signals triggered by the transmitter located in the receptacle and conducted through the optical cable.

A remote-control system of the above-described type is known from German Patent Document DE 3,043,627 C2. It is based on a mobile infrared hand-held transmitter which can be used outside a vehicle for the remote control of the vehicle locking system or of an electrical garage door drive and which can be inserted inside the vehicle into a receptacle, its transmitting key being automatically actuated and a security device being switched off by the triggered signal via an optical cable and a separate receiver.

A remote-control system is also known from U.S. Pat. No. 2,543,789 which permits a garage door drive to be controlled via two transmitters arranged permanently in a vehicle, these transmitters both being activatable from the passenger compartment to produce and transmit signals. A control of vehicle locking system functions or an arrangement of the transmitters which can be detached from the vehicle is not disclosed in this publication.

An object of the invention is to permit a better and more comfortable usability of the mobile (hand-held) transmitter of a remote-control system.

This and other objects are achieved by the present invention which provides a remote-control system for locks with a mobile infrared transmitter for generating and radiating in a contactless manner directional, coded control signals upon actuation of at least one transmitting key. A first receiver is tuned to the transmitter and is arranged on the motor vehicle for receiving and for processing the coded control signals transmitted by the transmitter and for triggering switching effects on a remote-controlled vehicle locking system. There is a receptacle in the motor vehicle for the transmitter, and at least one optical cable leading into a region of the receptacle that carries signals from the transmitter. A second receiver corresponds at least indirectly to the optical cable, and triggers switching effects on a further locking device upon the reception of signals triggered by the transmitter located in the receptacle and conducted through the optical cable. The optical cable is extended, starting from the receptacle for the hand-held transmitter up to at least one exit hole arranged in or directly behind the vehicle body outer skin, so that the signals of the hand-held transmitter located in the receptacle can pass to the second receiver located outside the vehicle.

In particular, with embodiments of the present invention, a second receiver which is assigned to a garage door drive can be actuated without the vehicle user having to take the transmitter out of the receptacle and align it with the second receiver. This is of course principally advantageous if the infrared hand-held transmitter is combined with the mechanical ignition key in a manner already known (e.g. German Patent Documents DE 3,314,072 C2, DE 3,828,794 A1). Then, the ignition key does not have to be specially pulled out of the ignition/starting lock, which in this case serves as a "receptacle" of the hand-held transmitter, in order to be able to control the garage door drive.

In an embodiment of the present invention, the at least one exit hole of the optical cable is advantageously arranged behind a transparent cover which is present in any case in the form of the lenses of the headlights or other light sources, or even behind the passenger compartment windows.

Preferably, the at least one exit hole is arranged at the front of the motor vehicle. However, a plurality of exit holes can be provided which are then arranged, for example, in pairs on the front and rear of the motor vehicle.

The embodiments of the present invention provide the possibility of providing a signal transducer in the optical cable, which signal transducer matches, with preferably different coding of the first receiver (vehicle-internal) and of the second receiver (vehicle-external), the coded signals of the hand-held transmitter tuned to the code of the first receiver and to the code of the second receiver. This has the advantage that a misplaced or stolen hand-held transmitter cannot be readily misused to open the garage. In addition, this effectively and reliably prevents both receivers responding simultaneously when the infrared hand-held transmitter is used outside the vehicle.

Due to the relatively high degree of bundling of the radiation of the infrared transmission, it is not to be expected when using the infrared hand-held transmitter inside the vehicle or receptacle that even the first receiver responds. If it does, a suitable, e.g. mechanical, shielding can be readily used to remedy this.

The signal transducer is connected via a plug-in connection to the optical cable according to an embodiment of the present invention, so that when the vehicle is sold it can be readily pulled off and replaced by a different signal transducer or a simple bypass. In another embodiment the signal transducer is an independent transmitter in which the same code as in the second receiver is stored and which can be actuated to emit its code signal by the hand-held transmitter via the optical cable between receptacle and plug-in connection. This code signal is then transmitted via the branches of the optical cable to the exit holes in the vehicle body outer skin.

Another embodiment provides for the injection of transmitter signals into optical waveguides, which, as proposed in German Patent Document DE-Utility Model 88 04 929, are provided in any case in the vehicle for guiding the light of signalling lamps, these optical waveguides leading into the outer skin of the vehicle as light exit surfaces of these signalling lamps.

Other objects, advantages and novel features of the present invention will become apparent from the following detailed description of the invention when considered in conjunction with the accompanying drawings.

DETAILED DESCRIPTION OF THE DRAWINGS

Figure 1:
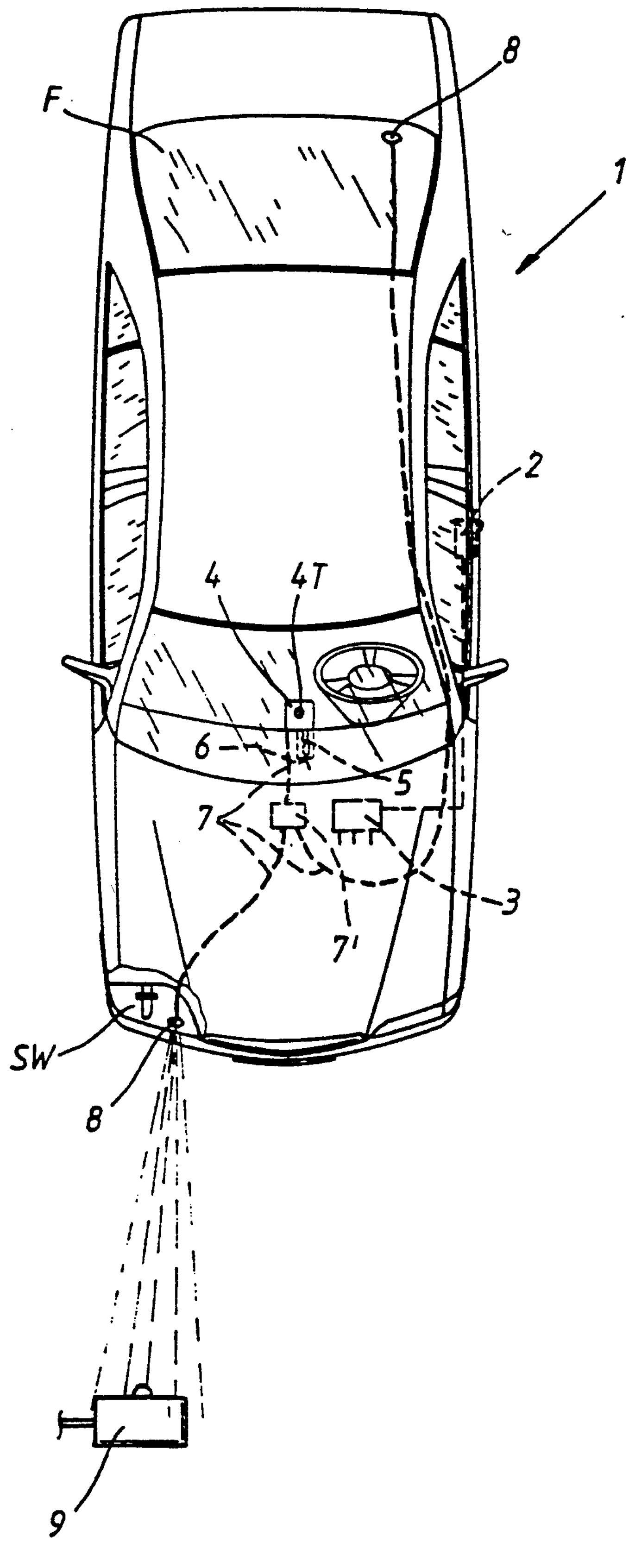
FIG. 1 shows a diagrammatic overall view of a vehicle with optical cables leading into the vehicle body outer skin.

In FIG. 1, there is a motor vehicle 1 illustrated in outline, equipped with a first receiver 2 and a control unit 3 of a central locking system (not illustrated further). In the motor vehicle 1 there is, in addition, a mobile hand-held transmitter 4 with a transmitting key 4T and an emitter 4E (FIG. 2) which is provided for the remote-control of the central locking system and is combined with a mechanical ignition key 5. The transmitter 4 with the key 5 is received in a receptacle 6 formed advantageously by the ignition/starting lock. An optical cable 7 leads into the region of the receptacle 6 and is branched at a line branch 7' to a plurality of exit holes 8 arranged on the vehicle body outer skin. These exit holes are arranged behind lenses of vehicle headlights SW or other light sources or behind the passenger compartment windows F, preferably, as shown, at the front and rear of the motor vehicle 1.

Figure 1A:
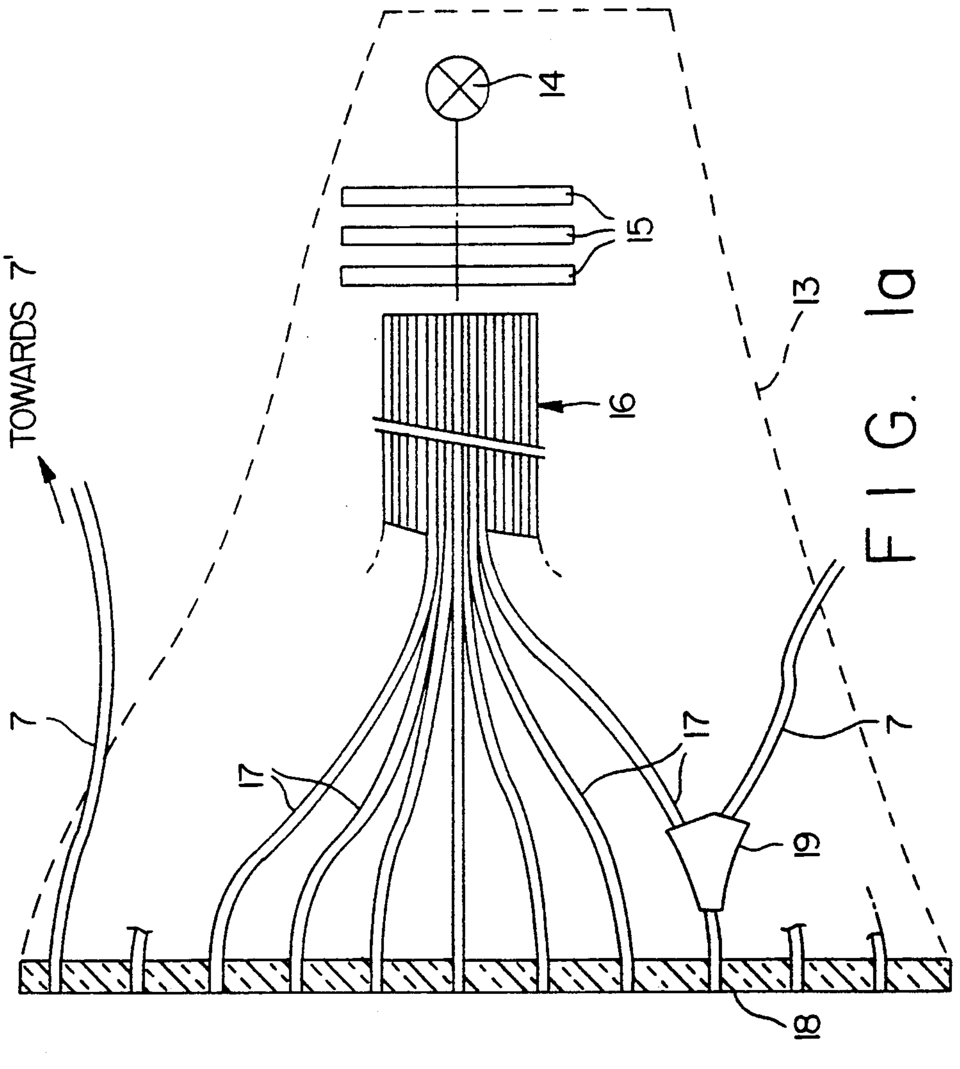
FIG. 1*a* shows a section view of a signaling lamp provided with optical waveguides, with one optical cable directly leading into a light exit surface of a signaling lamp, and with another optical cable connected with one waveguide by a junction.

An embodiment of a combination of the optical cable 7 with a signaling lamp 13 is shown in FIG. 1*a* by two alternatives, although only a single figure is shown. The signaling lamp 13 comprises a light source 14, a group of filters 15 for generating different light colors, a bundle 16 of optical waveguides 17 leading from the group of filters 15 into a common light exit surface 18 of the signaling lamp 13 in a known manner. As is shown in the upper part of FIG. 1*a*, the optical cable 7 may also lead into the common light exit surface 18 close to the waveguides 17, but is not a member of the bundle 16.

As is shown in the lower part of FIG. 1*a*, as an alternative embodiment a junction 19 between the optical cable 7 and at least one of the optical waveguides 17 is provided, in order to inject the signals of the mobile infrared transmitter into the waveguide.

Referring back to FIG. 1, arranged outside the motor vehicle 1 there is a second receiver 9 to which, shown by broken lines, signals from at least one of the exit holes 8 arranged on the vehicle body outer skin can be transmitted in a contactless manner. The second receiver 9 is associated preferably with a garage door drive (not illustrated).

The exit holes 8 of the optical cable 7 in the vehicle body outer skin are arranged such that even when the vehicle 1 is only roughly aligned with the second receiver 9, a sufficient signal intensity on the second receiver 9 is ensured. This can be done, for example, via beam bundling by means of appropriate lenses on the exit holes 8.

Both receivers 2 and 9 and the hand-held transmitter 4 are provided in a known manner with coding means, for example coding switches or coding memories.

Preferably a different code is stored in the second receiver 9 from that in the first receiver 2 so that the signals of the hand-held transmitter 4 coded to correspond to those of the first receiver 2 have to be converted in order to be able to trigger switching effects on the garage door drive.

Figure 2:
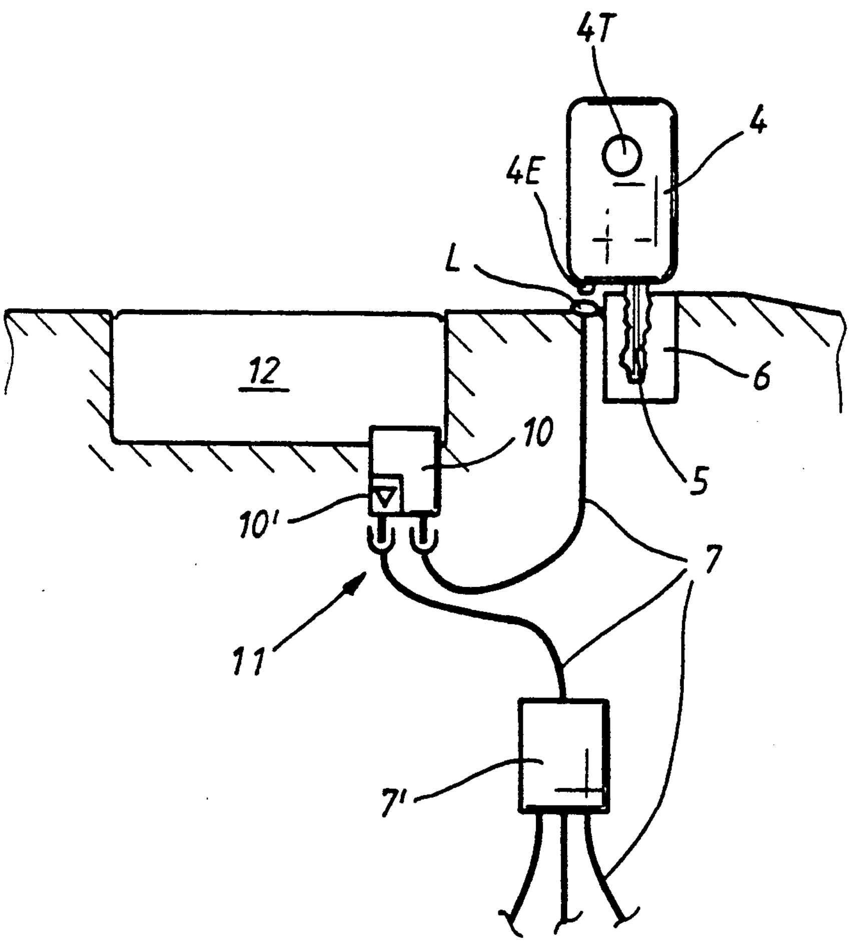
FIG. 2 shows a diagrammatic illustration of a signal transducer provided in the optical cable.

This task is assumed by a signal transducer 10 shown in FIG. 2, in which identical components have the same reference symbols as in FIG. 1. The signal transducer 10 is connected to the optical cable 7 directly behind the junction of the optical cable 7 with the receptacle 6. The junction is closed off by a collecting lens L which lies opposite the emitter 4E of the hand-held transmitter 4 when the hand-held transmitter 4 is in the working position. In this case, the working position may be defined by one or more of the settings of the ignition/-steering lock (not illustrated in detail) which forms the receptacle 6.

The code matched to the second receiver 9 is stored in the signal transducer 10. A symbolically indicated plug-in connection 11 between the optical cable 7 and the signal transducer 10 permits the signal transducer 10 to be replaced quickly, for example when the vehicle is sold, so that the hand-held transmitter 4 can then no longer be used to control the second receiver 9 without any access to the code of the hand-held transmitter 4 or of the second receiver 9. The mounting of the signal transducer 10, for example in a lockable glove compartment 12 of the motor vehicle 1 which is usually arranged in the vicinity of the ignition/steering lock, serves to permit quick access to it.

If required, instead of another signal transducer, a simple bypass can of course be provided. Likewise, a bypass can be provided if the vehicle owner should expressly require the same coding of the first and of the second receiver in order to be able to remotely control the garage door drive with the hand-held transmitter 4 even from outside the vehicle.

If required, an amplification of the signals of the hand-held transmitter in the optical cable is provided. A suitable amplifier 10' is integrated for this purpose in the signal transducer 10 or in a bypass replacing the transducer 10.

It is evident that, in addition to a garage door drive, there are also other applications for the remote-control system according to the invention, for example access control systems for parking areas or other traffic areas not accessible to public traffic such as industrial premises or barracks.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A remote-control system for locks, comprising:

a portable infrared transmitter which generates and radiates in a contactless manner directed coded control signals upon actuation of at least one transmission key on the transmitter;

a first receiver arranged on a motor vehicle, which first receiver is tuned to receive and to process the coded control signals radiated by the transmitter and is arranged for triggering switching effects on a remote-controlled vehicle locking system;

a receptacle in the motor vehicle for the transmitter;

at least one optical cable leading into a region of the receptacle, which carries signals from the transmitter;

a second receiver corresponding at least indirectly to the optical cable for triggering switching effects on a further locking device upon the reception of signals triggered by the transmitter located in the receptacle and conducted through the optical cable; and at least one radiation outlet arranged on an exterior surface of the motor vehicle to which the optical cable emerging from the receptacle is routed, so that the signals triggered by the transmitter located in the receptacle are transmittable to the second receiver located outside the vehicle.

2. The remote-control system according to claim 1, wherein the portable transmitter includes means for controlling an electrical garage door drive, and the second receiver is assigned to the garage door drive.

3. The remote-control system according to claim 2, wherein the transmitter is coupled to a mechanically coded key and the receptacle is at least one of an ignition lock or a steering lock.

4. The remote-control system according to claim 3, further comprising:

means for storing with the second receiver a code different than that stored with the first receiver;

means for storing the code stored with the first receiver with the portable transmitter;

a code converter connected to the optical cable between the receptacle and the radiation outlet for converting the code of the control signals radiated from the transmitter so as to match with the code stored with the second receiver.

5. The remote-control system according to claim 1, further comprising a plurality of radiation outlets and a line branch in which the optical cable is branched to the plurality of radiation outlets.

6. The remote-control system according to claim 5, wherein at least one radiation outlet is in the vicinity of a transparent part of the exterior surface of the motor vehicle at one of the front or rear of the motor vehicle.

7. The remote-control system according to claim 6, wherein at least one radiation outlet is behind a cover of a lighting device.

8. The remote-control system according to claim 6, wherein at least one radiation outlet is behind a window pane of the motor vehicle body.

9. The remote-control system according to claim 4, further comprising an easily detachable connection for connecting the code converter to the optical cable.

10. The remote-control system according to claim 9, wherein the code converter is an independent transmitter, in which the same code as in the second receiver is stored and which can be activated by the portable transmitter to transmit its code signal to the second receiver.

11. The remote-control system according to claim 9, further comprising an amplifier connected to the optical cable.

12. The remote-control system according to claim 1, further comprising optical waveguides which are arranged in the vehicle between a light source and a common light radiating outlet surface of a signalling lamp in the vehicle exterior surface, wherein the signals of the portable infrared transmitter are conducted via the optical cable into the common light outlet surface of said optical waveguides.

13. The remote-control system according to claim 10, wherein the code converter and the easily detachable connection of the code converter to the optical cable are mounted in a lockable glove compartment of the motor vehicle.

14. The remote-control system according to claim 3, further comprising:

means for storing with the second receiver a code different than that stored with the first receiver;

means for storing the code stored with the first receiver with the portable transmitter;

a code converter connected to the optical cable between the receptacle and the radiation outlet for converting the code of the control signals radiated from the transmitter so as to match with the code stored with the second receiver.

15. The remote-control system according to claim 14, wherein the code converter is an independent transmitter, in which the same code as in the second receiver is stored and which can be activated by the portable transmitter to transmit its code signal to the second receiver.

16. The remote-control system according to claim 1, wherein the at least on radiation outlet is in the vicinity of a transparent part of the exterior surface of the motor vehicle at one of the front or rear of the motor vehicle.

17. The remote-control system according to claim 4, wherein the code converter is an independent transmitter, in which the same code as in the second receiver is stored and which can be activated by the portable transmitter to transmit its code signals to the second receiver.

18. The remote-control system according to claim 1, further comprising an amplifier connected to the optical cable.

19. The remote-control system according to claim 9, wherein the code converter and the easily detachable connection of the code converter to the optical cable are mounted in a lockable glove compartment of the motor vehicle.

20. The remote-control system according to claim 9, wherein the easily detachable connection is a plug-in connection.

* * * * *